United States Patent [19]
French

[11] 3,821,553
[45] June 28, 1974

[54] DUAL WAVELENGTH MOISTURE GAUGE HAVING AUTOMATIC GAIN CONTROL

[75] Inventor: John Michael French, San Jose, Calif.

[73] Assignee: Measurex Corporation, Cupertino, Calif.

[22] Filed: Nov. 17, 1972

[21] Appl. No.: 307,332

[52] U.S. Cl................. 250/339, 250/226, 250/345, 250/354
[51] Int. Cl. .............................................. G01t 1/00
[58] Field of Search ........... 250/339, 236, 226, 345, 250/354

[56] References Cited
UNITED STATES PATENTS

| | | | |
|---|---|---|---|
| 2,549,402 | 4/1951 | Vossberg | 250/226 |
| 3,089,382 | 5/1963 | Hecht et al. | 250/226 |
| 3,150,264 | 9/1964 | Ehlert | 250/338 |
| 3,174,045 | 3/1965 | Whitney | 250/226 |
| 3,228,282 | 1/1966 | Barker | 250/359 |
| 3,405,268 | 10/1968 | Brunton | 250/339 |
| 3,521,958 | 7/1970 | Treharne | 250/226 |
| 3,678,262 | 7/1972 | Herman | 250/339 |

Primary Examiner—James W. Lawrence
Assistant Examiner—Harold A. Dixon
Attorney, Agent, or Firm—Flehr, Hohbach, Test, Albritton & Herbert

[57] ABSTRACT

A dual wavelength type moisture gauge having a fixed source of radiation and capable of measuring moisture on all grades of paper. A fixed source of radiation having at least two wavelengths, one of which is sensitive to absorbtion of water and another which is substantially less sensitive to absorbtion by water, is positioned on one side of a sheet of paper. A detector unit is positioned either to receive backscattered radiation or transmitted radiation. The detector unit includes optical filters for separating the two wavelengths of interest. Transducers convert the optical signals to corresponding electrical signals. Connected to the transducers is an automatic gain control amplifier that has an input portion which alternately samples the two signals. The samples are amplified and supplied to an output portion which is synchronized with the input sampling portion for separating the sampled and amplified signals. One of the output signals is fed back to the gain control of the amplifier such that the gain of the amplifier will vary inversely with the output of the amplifier.

5 Claims, 5 Drawing Figures

DUAL WAVELENGTH MOISTURE GAUGE HAVING AUTOMATIC GAIN CONTROL

BACKGROUND OF THE INVENTION

The present invention relates to moisture gauges for continuously measuring the moisture in a sheet of moving paper. More particularly the invention relates to an infra-red moisture gauge having a constant lamp intensity.

Moisture gauges for measuring the moisture content of a moving sheet of paper being manufactured by a paper machine are well known in the art. One type of gauge includes an infrared (IR) radiation source that emits radiation in two spectral bands. One band, typically around 1.8 microns, is used as a reference because it is insensitive to moisture and yet is near a moisture absorption band. A second band, typically around 1.9 microns, is highly sensitive to absorption by water. The attenuation of the 1.9 band therefore gives a good indication of the amount of moisture in the paper. A beam of IR radiation carrying both the 1.8 and the 1.9 wavelengths is focused on the paper, and the radiation transmitted in the case of a transmission gauge or reflected in the case of a backscatter gauge is detected by cells that produce an output signal proportional to the intensity of the received radiation. The 1.8 and 1.9 signals are ratioed to provide a signal compensated for absorption by the fibers in the paper, dirt buildup on the gauge windows, and changes in the electronics due to temperature variation.

The signal, R, representative of the ratio of the 1.8 and 1.9 wavelengths, is converted to percent moisture by a procedure called calibration which is typically done in the following manner. A number of samples are selected, each having the same basis weight, and are bone dryed or dryed with a fixed percentage moisture. Different quantities of water are then added to each sample and they are sealed in plastic bags to allow the water to be absorbed by the paper. After additional weighing, the actual water weight, W, of the samples is then known.

The next step in the calibration procedure is to place one sample at a time in the moisture gauge and obtain a ratio reading, R, for each sample. The R values are then plotted against the water weight values determined by the weighing process previously mentioned and the best curve is then fitted to the sample points. The curve is then mathematically modeled with the constants determined from the plotted curve. A good account of the calibration procedure is given by U.S. Pat. No. 3,641,349 issued to Dahlin.

A key objective in designing a moisture gauge is to improve the dynamic range and accuracy thereof. The prior art describes improvements made to IR moisture gauges to enhance these characteristics. Typically they have taken the form of modifications to the basic gauge to compensate for discovered physical effects that tend to reduce the gauge's accuracy.

A significant improvement is achieved by using a two wavelength ratio as discussed previously. Other improvements have been achieved by positioning a chopper wheel in the path of the radiation source to compensate for drifts in the characteristics of the detector cells as described in the Dahlin patent, supra, special standardization techniques as described in U.S. Pat. No. 3,205,355 issued to Ehlert, and the use of two detectors as described in U.S. Pat. No. 3,614,450 issued to Hill, et al.

The present invention is another improvement on the IR moisture gauge designed to further improve the sensitivity and dynamic range thereof. A particularly troublesome aspect of moisture gauge design is tied to the very large dynamic range that the moisture gauge electronics must be able to handle. If a gauge is to be used on a range of paper grades from lightest to the heaviest papers produced, the attenuation of the signal due to fiber content will vary by two orders of magnitude. In addition, the variation due to differing amounts of water will be at least one order of magnitude. Thus, the intensity of radiation reaching the detectors will vary by three orders of magnitude. Another way of saying this is that the system must have a dynamic range covering three orders of magnitude. In addition to the dynamic range problem, the system must also be able to resolve the signals to the desired accuracy.

One approach at solving this problem is described in the Hill patent, supra, where the intensity of the lamp was changed to compensate for changes in paper weight. This approach did help the dynamic range somewhat, but did not go nearly far enough. Furthermore, varying the lamp intensity changes the relative energy in the two wavelengths which reduces accuracy. The result of all this was that the prior art gauges could not measure all weights of paper, and on those paper weights that they would measure, their accuracy was limited to about ± 1 percent of moisture. It is, therefore, an object of this invention to provide a moisture gauge capable of making measurements to an accuracy of better than 1 percent.

Another object of the invention is to provide a moisture gauge having a dynamic range broad enough to measure all grades of paper.

Another object of the invention is to provide a moisture gauge having a constant intensity source.

SUMMARY OF THE INVENTION

These and other objects of the invention may be achieved with a moisture gauge having a source and detector. The source provides a beam of radiation having a constant intensity and a spectrum that spans at least one absorption band of water. A detector receives radiation either transmitted or backscattered from the material whose moisture is to be measured. Within the detector, transducer or converter means are provided to convert the received radiation to two electrical signals, one signal being representative of the intensity of radiation received in a spectral band highly sensitive to absorption by water and the other signal being representative of the intensity of radiation received in a spectral band near that of the first but relatively insensitive to absorption by water. Connected to the transducer is an amplifier for amplifying the two signals such that the electrical signal representative of the radiation received in the non-moisture sensitive band is maintained at a substantially constant level regardless of the variations in intensity of the received radiation.

DESCRIPTION OF A PREFERRED EMBODIMENT

Figure 1:
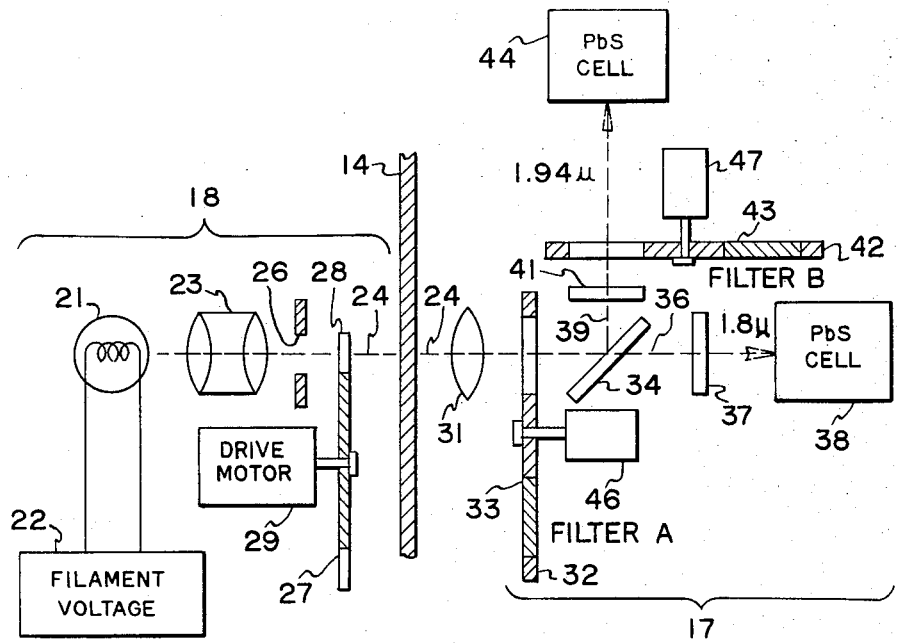
FIG. 1 is a schematic representation, partially in block diagram form and partially in cross-section, of a portion of the mechanical configuration required by the present invention.
Figure 1A:
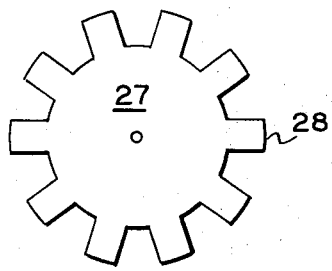
FIG. 1A is a plan view of one of the elements of FIG. 1.

Referring to FIG. 1, the source unit is indicated generally by reference numeral 18 and consists of a tungston light source 21 having a filament voltage source 22 capable of remote adjustment. The light source 21 may be of the General Electric type Q.Ga/r$^4$DCR, 200 watts, capable of supplying radiation in both the 1.8 and 1.9 micron wavelength bands. Radiation from source 21 is collimated by an optical system schematically shown by element 23. The collimated beam is indicated by dashed line 24 and extends through an aperture 26 where it encounters a chopper wheel 27 that is best illustrated in FIG. 1A. Chopper wheel 27 is rotated at high speeds, and is located in connection with light beam 24 so that the teeth 28 thereof recurrently interrupt the beam and cause the light passing beyond to take the form of a series of sharp pulses having a frequency which is determined by the rotational velocity of the wheel, its diameter, and the geometry of the teeth. A drive motor 29 is connected to chopper wheel 27 and would typically be of the variable speed type so that the chopping frequency could be varied.

Figure 1B:
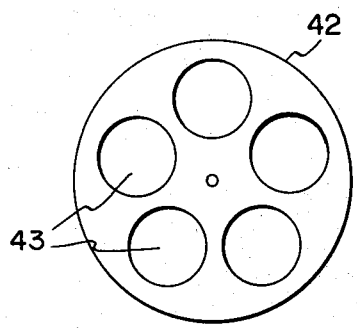
FIG. 1B is a plan view of another of the elements of FIG. 1.

After chopping, beam 24 is passed through paper sheet 14 where it is collected by lens 31 of detector unit that is indicated generally by reference numeral 17. The beam is attenuated by the paper, and the attenuation is a function of both the moisture in the paper and also the opacity of the paper. The collected and collimated beam is transmitted through a first radiation filter assembly 32 designated the A filter which consists of a disk having several filters 33. In the position shown in the figure, there is no filter in the beam path. After leaving the A filter, the beam passes through a beam splitter 34 which may, for example, be a half silvered mirror. One portion of the split beam, identified by numeral 36, passes through a filter 37 which has a pass band centered around 1.8 microns. The filtered beam is then detected by lead sulfide cell 38. The other portion of the split beam, identified by reference numeral 39, passes through filter 41 having its pass band centered around 1.9 microns. Beam 39 is then passed through a second standardization filter assembly 42, designated the B filter, which includes several different filters 43 as best illustrated in FIG. 1B. Beam 39 is then detected by lead sulfide cell 44.

Figure 2:
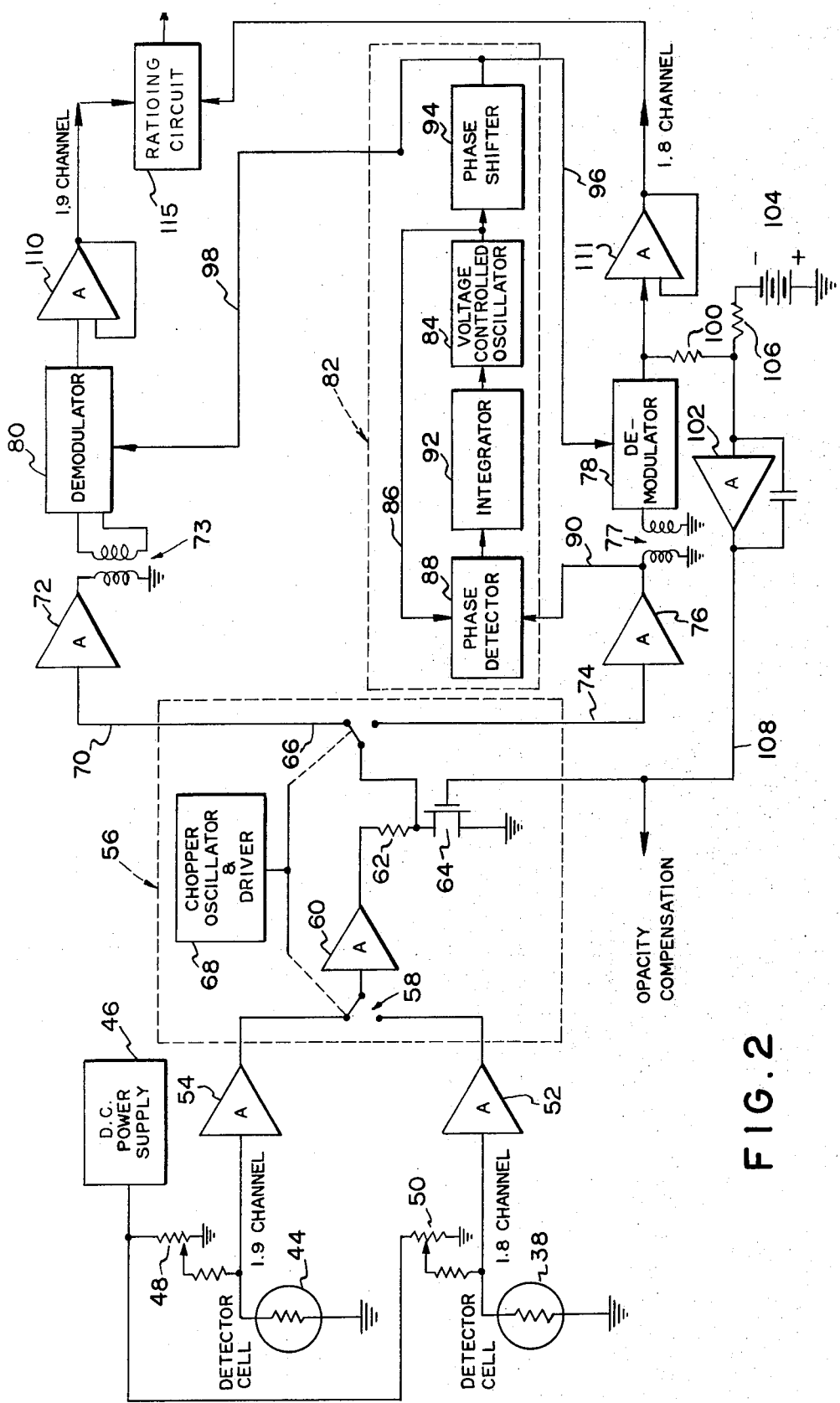
FIG. 2 is a block diagram of a preferred embodiment of the electronics of the invention.

A preferred embodiment of the electronics will be described in connection with FIG. 2. Referring now to FIG. 2, lead sulfide cells 38 and 44 are shown as resistors. And, in fact, they behave electrically as variable resistors, the value of which varies inversely with the intensity of radiation to which they are exposed. Cells 38 and 44 are biased by a high-voltage DC power supply 46 that typically supplies voltage in the range of 300 volts through potentiometers 48 and 50 to cells 44 and 38, respectively. Electrically connected to cells 38 and 44 are conventional preamplifiers 52 and 54 whose function is merely to raise the voltage level of the input signals.

The amplitude of the signals emerging from preamplifiers 52 and 54 often vary over a range of up to two orders of magnitude. This is caused by variations in the opacity of the paper due to variations in the pulp fiber mix and variations in basis weight. From a signal processing point of view, it is desirable to reduce the variability of these signals. This is achieved by amplifying the signals in a controlled manner such that the resultant signals are held at a constant level. For example, the 1.8 channel may be held at a value of 8 volts. However, the relationship between the 1.8 channel and the 1.9 channel must be very accurately maintained so that ratio of the two signals does not vary.

The automatic gain controlling function is performed by the apparatus indicated generally by reference numeral 56. as can be seen from FIG. 2, the 1.8 micron and 1.9 micron channels both enter and leave the automatic gain controller as independent channels. The simplest approach to performing the automatic gain control function would be to have a separate automatic gain control amplifier for each channel, but having the gain of both amplifiers respond to the same feedback signal. This approach may be used for many applications. However, it is unsatisfactory for any application where the amount of gain supplied to each channel must be rigorously controlled within very tight tolerances. The basic problem is that amplifier components do not precisely track one another. The voltage current characteristics as well as temperature characteristics of each semiconductor component will vary somewhat one from another. Consequently, even though two separate amplifiers were responding to the same feedback signal, the amount of amplification supplied to the input thereon would vary from channel to channel.

This problem is solved by time multiplexing the 1.8 and 1.9 channels, passing the multiplexed signal through a single automatic gain control amplifier network, and then demultiplexing the output. The feedback signal for the automatic gain control is taken from the output of the 1.8 micron channel. To this end, the output of amplifiers 52 and 54 are supplied to switch 58 which alternately samples the 1.8 and 1.9 micron channels. Amplifier 60 is provided to eliminate any loading of the 1.8 or 1.9 channel and thereby allows very high-speed accurate sampling. The output of amplifier 60 is supplied through resistor 62 to the source of field effect transistor 64. The drain of field effect transistor 64 is grounded. In operation, field effect transistor 64 acts as a voltage variable, voltage divider. As the resistance of field effect transistor 64 increases, the voltage supplied to switch 66 also increases. This is true because the percentage of the total voltage drop across resistor 62 is decreased.

Switches 58 and 66 are operated synchronously and are controlled by a chopper oscillator and driver circuit 68 well known in the prior art.

The output of automatic gain control apparatus 56 is a pair of amplitude modulated AC signals. The 1.9 micron channel is taken from output 70 and supplied to amplifier 72 where the output of the 1.8 channel is taken from output 74 and supplied to amplifier 76. Amplifiers 72 and 76 are narrow-band amplifiers that eliminate extraneous harmonics introduced by the time multiplexing operation. The output of these amplifiers then appears as a pure sinusoidal amplitude modulated signal.

The outputs of amplifiers 72 and 76 are supplied to a pair of demodular circuits 78 and 80 which precisely convert the information contained in the amplitude modulated AC signal to DC information. The function of demodulator circuits 78 and 80 is basically that of peak detection. Such circuits are well known in the art; however, a preferred embodiment will be described in connection with FIG. 3.

In order to detect the peak of the information carrying signals accurately, a carrier signal having the same frequency as and a precise phase relationship with the information carrying signal is needed. To provide this function, a phase locked loop indicated by a reference numeral 82 is provided to lock on the 1.8 micron channel. The loop consists of a conventional voltage controlled oscillator 84 which is amplitude stable. The output of voltage control oscillator 84 is supplied via lead 86 to one input of phase detector 88. The input from the 1.8 micron channel is supplied to phase detector 88 from the output of band pass amplifier 76 via lead 90. Phase detector circuit 88 is of conventional design and supplies an output signal to integrator 92 proportional to the phase relationship between the two inputs. A zero level error signal is provided when the phase is precisely 90°. Integrator 92 is provided so that there is zero residual error in the phase locked loop. The output of integrator 92 is the integral of the error signal supplied by phase detector 88. This signal is supplied to the voltage controlled oscillator 84 whose output frequency is regulated by the voltage level of the control signals supplied thereto. The output of voltage controlled oscillator 84 is also supplied to phase shifter network 94. This network provides a 90° phase shift between its input and output and is needed to compensate for the phase detector circuit 88 which supplies an error signal of zero when the phase relationship between the two inputs is 90°. Thus the output of phase shifter 94 is a signal having exactly the same frequency and phase as the AC signal in both the 1.8 and 1.9 micron channels being supplied to demodulators 78 and 80. The output of phase shifter 94 is supplied through leads 96 and 98 to demodulators 78 and 80.

The output of the 1.8 micron channel demodulator is utilized as a feedback to the automatic gain amplifier 56. The output of demodulator 78 is supplied through resistor 100 to the input of integrating amplifier 102. A precise voltage reference 104 is connected through resistor 106 to the input of amplifier 102. This arrangement acts as a comparator circuit. So long as the voltage flowing through resistor 100 is the same as the voltage flowing out through resistor 106 to voltage source 104, there will be no error signal supplied to integrator 102. However, when the output of demodulator 78 deviates from its nominal value, the excess or deficiency of current flowing through resistor 100 will cause integrator 102 to supply an output signal proportional to the integral of that current variation. This signal is then supplied through line 108 to the gate of field effect transistor 64. The feedback loop is such that the output of demodulator 78 is maintained at a constant voltage. Since the 1.9 micron channel is also being amplified by precisely the same amount as the 1.8 micron channel, the relationship between the two signals remain the same.

The output of demodulators 78 and 80 are supplied through unity gain buffer amplifiers 110 and 111, either to a conventional ratioing circuit (not shown) whose output is proportional to the water weight contained in the paper or to a computer (not shown).

Although not important to the broad concept of the invention, it is important from an operational point of view that the type of f.e.t. used be matched with the polarity of the output of integrator 102. In this case an enhancement mode f.e.t. is used. Consequently increased signal from integrator 102 will cause increased conduction through f.e.t. 64 and therefore reduced gain out of the automatic gain control amplifier. Thus, as more radiation passes through the paper, the output of integrator 102 will increase which in turn lowers the resistance of f.e.t. 64.

Figure 3:
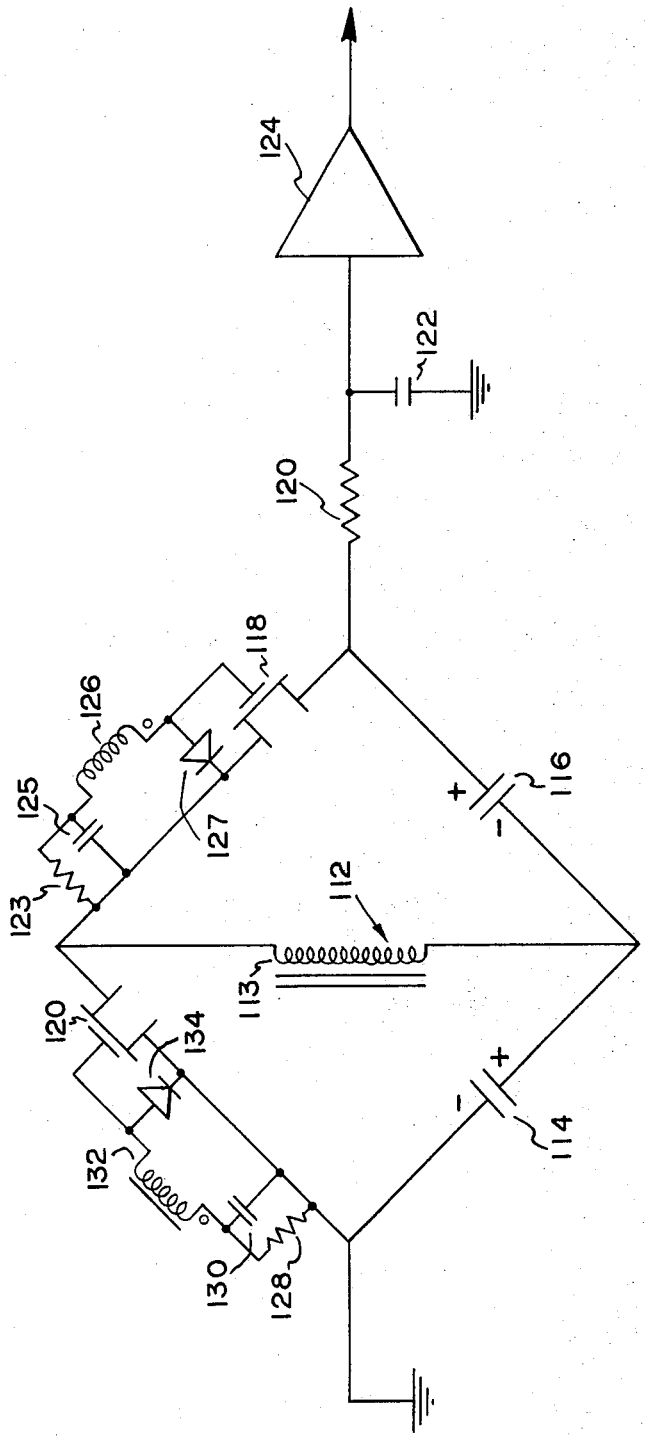
FIG. 3 is a circuit diagram of a portion of FIG. 2.

A preferred embodiment of demodulator circuits 78 and 80 believed to be novel, will now be described in connection with FIG. 3. Since circuits 78 and 80 are identical, the circuit will be described for only one channel.

In FIG. 2 the output of bandpass amplifier 72 is supplied across the primary of the transformer 73. The secondary of transformer 73 is shown in FIG. 3 by reference numeral 112 where it supplies the input to a bridge circuit. The bridge circuit, shown in FIG. 3, includes two capacitor legs, 114 and 116, and two legs with field effect transistor gates 118 and 120. The output of the circuit is taken at the common node between field effect transistor 118 and capacitor 116 and is supplied through a conventional RC filter consisting of resistor 120 and capacitor 122 to the input of operational amplifier 124.

The circuit as described so far operates as a conventional doubling circuit in the following manner. When the top side of the secondary of transformer 112, illustrated by reference numeral 113 is high, field effect transistor 118 is in a conducting mode and capacitor 116 is charged. When the input voltage reverses, the top of the secondary 112 is low and transistors 120 is in a conducting mode. Transistor 118 is nonconducting. In this condition, capacitor 114 is charged as indicated by the polarity signs. As can be seen, at the end of any particular input cycle, the voltage between ground and the output terminal consists of the sum of the voltages on capacitor 114 and capacitor 116. Thus the circuit operates as a peak to peak detector. So far, the circuitry has been conventional in design. However, the technique used to control the field effect transistor 118 and 120 is unique and provides advantages over known prior art techniques.

A key objective of the entire gauge is to provide readings that are very accurate. That is, moisture readings that are accurate to 0.25 percent. In order to do this, it is necessary to resolve a 10V signal to 10 mV ± 1 mV, and this degree of resolution requires a very accurate demodulator circuit. Self demodulation techniques will not work because, first of all, the amplitude of the carrier signal varies radically in the 1.9 channel and the use of diodes introduces significant temperature sensitivity into the circuitry. To overcome this problem, the special control circuit for field effect transistors 118 and 120 was devised.

For transistors 118 the control circuitry consists of the parallel combination of resistor 123 and capacitor 125 connected in series with a transformer secondary winding 126. This parallel series combination is connected between the gate of transistor 118 and its source. In addition, a diode 127 is connected between the gate and source of field effect transistor 118.

For field effect transistor 120, the parallel combination of resistor 128 and capacitor 130 is connected in series with secondary winding 132. The series parallel combination is then connected between the gate of field effect transistor 120 and its drain. A diode 134 is connected between the gate and drain of field effect transistor 120. As discussed in connection with FIG. 3, the output of phase shifter network 94 is a signal phase locked with the chopper oscillator driver 68. This signal is coupled to the gates of field effect transistors 118 and 120, through secondary windings 126 and 132 respectively. The primaries of these transformers are not shown on FIG. 2 for the sake of clarity. The polarity of transformer winding 126 and 132 is indicated by dots, and it should be noted that the windings are 180° out of phase with each other.

In operation the circuit works in the following manner. As the signal across secondary winding 126 goes positive, 0.2 volts will be dropped across diode 127 and the remainder of the applied voltage, typically 15 volts, will be dropped across capacitor 125. Thus capacitor 125 will charge to a value of 14.8 volts. This means that during the half cycle when the dot end of secondary winding 126 is positive, the gate to source voltage of field effect transistor 118 will be the same as the voltage drop across diode 127, namely 0.2 volts. When the polarity of secondary winding 126 reverses, the gate to source voltage of field effect transistor 118 will go down to −29.8 volts. Consequently, the gate to source voltage of field effect transistor 118 will vary from −29.8 volts to +0.2 volts. The field effect transistor chosen for this function is a conventional junction-type having a threshold voltage of −3 volts nominal. Thus transistor 118 will commence conducting as the voltage across winding 126 reaches −3 volts, and will continue to conduct until the voltage again drops below −3 volts. Since the signal supplied to winding 126 is phase locked with the signal supplied across winding 113, the peak values of that signal will be stored on capacitors 114 and 116. To make sure that the peak values are stored, phase shifter 94 may be adjusted so that the signal across winding 126 when leads or lags that across winding 113 by an appropriate small increment.

The circuitry associated with field effect transistor 120 operates in the same manner as that just described in connection with field effect transistor 118.

I claim:

1. An apparatus for measuring the moisture associated with a sheet of paper comprising:
   a. a constant intensity radiation source that emits a first spectral band of radiation lying substantially outside of the absorption band of water and a second spectral band of radiation lying substantially within the absorption band of water;
   b. optical means for collecting said radiation from said source;
   c. optical means for separating said radiation into first and second channels each including one of said spectral bands of radiation;
   d. converter means for converting said first and second channels of optical radiation into corresponding first and second electrical signals;
   e. amplifier means for amplifying said first and second electrical signals said amplifier means including
   1. input switching means for alternately connecting said first and second channels of electrical information to said amplifier means;
   2. an amplifier connected to said input switching means and having an output;
   3. variable attenuator means connected to said amplifier means for controlling said output;
   4. output switching means connected to said output of said amplifier;
   5. driver means connected to said input switching means and said output switching means for causing the synchronous switching thereof whereby said first and second electrical signals are alternately sampled and amplified to a constant level and separated into two separate channels;
   6. first and second demodulator means connected to said output switching means such that said first amplified electrical signal supplied to said first demodulator means and said second amplified electrical signal is supplied to said second demodulator means;
   7. phase locking means connected to said first and second demodulator means and responsive to the output of said amplifier for supplying to said demodulators to a signal having a predetermined phase relationship with the output of said amplifier.

2. The apparatus of claim 1 wherein said demodulator circuit comprises:
   a. a bridge circuit having input means connected thereacross, two capacitive legs, and two switching legs responsive to said phase locked signal for alternately charging said capacitive legs to the peak value of alternate phases of a signal supplied to same input means whereby charge representative of the peak to peak value of the amplified signal supplied to said demodulator is captured on said capacitive legs.

3. The apparatus of claim 1 wherein said demodulator circuit comprises:
   a. first and second capacitive legs having one terminal in common;
   b. first and second switching means having one terminal in common and an other terminal of each connected to said first and second capacitive legs such that a bridge network is formed;
   c. input means connected between said common capacitor terminal and said common switch terminal;
   d. output means connected to the common node between said switch means and capacitor means;
   e. and switch control means connected to said switches for turning on said switches such that said capacitors are alternately charged to the peak value of the signal impressed upon said input means whereby the output signals supplied from said bridge network is a substantially dc signal having a magnitude equal to the peak to peak voltage of a signal supplied to said input means.

4. The apparatus of claim 3 wherein said switching means are field effect transistors having source, drain, and gate electrodes; and said switch control means includes means connected between the gate and source of said field effect transistor and responsive to the output of said phase locking means for causing said transistor to conduct a certain predetermined portion of the cycle of said first and second electrical signals.

5. An apparatus for measuring the moisture associated with a sheet of paper comprising:
   a. a constant intensity radiation source that emits a first spectral band of radiation lying substantially outside of the absorption band of water and a second spectral band of radiation lying substantially within the absorption band of water;
   b. optical means for collecting said radiation from said source;
   c. optical means for separating said radiation into first and second channels each including one of said spectral bands of radiation;
   d. converter means for converting said first and second channels of optical radiation into corresponding first and second electrical signals;
   e. amplifier means for amplifying said first and second electrical signals and for providing at least one substantially constant output signal related to one of said electrical signals said amplifier means including:
   1. a feedback loop having a reference voltage to which said output signal of said amplifier means is compared and from which an error signal is derived;
   2. an integrator circuit to which said error signal is supplied; and
   3. means for varying the gain of said amplifier means in response to the output of said integrator so that the output signal of said amplifier means remains at a substantially constant level said integrator providing a substantially zero residual error while maintaining loop stability.

* * * * *